:::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::

2,728,949

PROCESS FOR MAKING MINERAL WOOL

Everett Weldon Sweet, Morristown, N. J., assignor to Aquex Development and Sales Corporation, Whippany, N. J., a corporation of New Jersey No Drawing. Application October 21, 1949,
Serial No. 122,863

1 Claim. (Cl. 18—47.3)

This invention relates in general to the production of so-called "mineral wool" and in particular to a process for rendering mineral wool water-resistant during its formation.

Mineral wool is normally produced by melting silica slag, silica, sand, rock or other siliceous material and disrupting the molten mass, by means of steam blast, into a multiplicity of fibres. The "wool" thus produced is characterized by containing a certain amount of fine dust which is objectionable. Mineral wool, despite its capillarity, absorbs a substantial amount of moisture, will take up a large quantity of water and will not float on water, and the water is difficult to remove on drying. After wetting, it loses its insulating value.

It is a general object of the present invention to provide a process for rendering mineral wool water-resistant and waterproof, to reduce its moisture regain, and to produce a product which will float on water.

A specific object is to provide a process and apparatus for rendering mineral wool water-resistant during its formation in a simple, efficient and inexpensive manner.

According to the present invention, a stream of molten siliceous material is subjected to a blast of steam to disrupt the siliceous material into fibres, the steam containing, entrained therein, a composition comprising a thermosetting resin, a mineral oil and a water-insoluble wax-like substance selected from the group consisting of waxes and heavy metal salts of the higher fatty acids. In a now preferred embodiment, the waterproofing composition is added to the steam in two parts, one of the parts comprising an aqueous dispersion of the resin, the other comprising the oil and wax-like substance, both being mixed with the steam prior to its contact with the molten stream of siliceous material.

The process is applicable to waterproofing fibres formed of siliceous materials as a class, such for example, as glass, slag, silica, sand, rock, asbestos and the like. The materials are rendered molten by heating and the molten siliceous material dispersed into fibres in a known manner. It is characteristic of the present invention that the fibres are waterproofed concurrent with their formation and while the fibres are hot. Any conventional apparatus may be used for forming the siliceous fibres.

The waterproofing materials employed in the process comprise a thermosetting resin, a mineral oil and a wax-like substance.

According to the invention, the waterproofing materials are applied to the siliceous fibres at a point between the point of formation and the point of deposition. In the now preferred embodiment the waterproofing composition is applied to the fibres while they are at an elevated temperature, the temperature being sufficiently high to cause a prompt curing of the resin.

For the thermosetting resin there may be employed a phenol-formaldehyde resin, urea-formaldehyde resin, melamine-formaldehyde resin, alkylated urea-aldehyde resins and alkylated melamine-aldehyde resins, thiourea-aldehyde resins, glyoxal and the like.

To advance the cure of the resin, there is also employed a suitable curing catalyst therefor, such for example, as an acid or a potentially acid material of the type well known in the art of thermosetting resins. The thermosetting resin is employed initially in the thermoplastic state and in combination with the catalyst, and the resin is cured or polymerized in situ on the siliceous fibres to the water-insoluble infusible state.

For the mineral oil, there may be employed any mineral oil of high viscosity, but preferably an oil which has a flash point above 400° F. and which is also chemically inert under the conditions of application. A suitable oil is a paraffin base saturated hydrocarbon oil derived from petroleum. The function of the oil is primarily to lay the dust created in the fibre-forming operation. For the water-resistant ingredient of the composition, there may be employed any animal, mineral or vegetable wax, or synthetic wax-like substance, which is inherently hydrophobic and water-resistant. Among the animal waxes which may be employed are spermaceti and beeswax. The mineral waxes may comprise paraffin, cresin and ozokerite, and the vegetable waxes may comprise any glycerol ester of a higher saturated fatty acid, such as carnauba, palm wax and montan wax.

However, in the now preferred embodiment, the water-resistant ingredient comprises a water-insoluble soap, such for example, as soap formed from a higher fatty acid and a heavy metal such, for example, as zinc stearate, aluminum stearate, magnesium palmitate, and calcium stearate. The water-insoluble soaps and the several ingredients of the composition may be applied separately to the siliceous fibres, but in the preferred embodiment they are applied in certain combinations as a matter of convenience and also for superior anchorage. For example, in the preferred embodiment, the water-resistant ingredient, such as zinc stearate, is dissolved in the mineral oil, the oil thus serving in addition as a vehicle for this ingredient.

In the now preferred embodiment, the composition also comprises an aqueous colloidal dispersion containing finely divided particles of a mixture of polyvinyl acetate and wax stabilized by means of a colloidal substance. This colloidal dispersion may be prepared according to the process described in my co-pending application Ser. No. 94,527 filed in the United States Patent Office on May 20, 1949, which process comprises first preparing a colloidal solution of the colloidal substance in water, adding polyvinyl alcohol thereto, then converting the polyvinyl alcohol to polyvinyl acetate and precipitating the resin in the form of fine particles by adding acetate ions to the colloidal solution and stirring into this dispersion molten wax, and finally homogenizing the colloidal composition to render it uniform. In the colloidal dispersion, the colloidal substance may comprise from 1 to 10 parts by weight, the polyvinyl acetate 1 to 10 parts, the wax 3 to 25 parts and water sufficient to make 100 parts.

When the colloidal dispersion is applied to the siliceous materials, the amount of the thermosetting resin may comprise 1 to 5 parts by weight thereof. When wax is incorporated in the colloidal dispersion, it may be omitted from the inert mineral oil, but, if desired, it may be applied both as a solution in the mineral oil and as particles in the aqueous colloidal dispersion.

When the composition of the invention comprises only the thermosetting resin, the wax and the mineral oil, these ingredients may be applied at any point from the point of formation of the fibres to the point of deposition. When the aqueous colloidal dispersion of polyvinyl acetate colloid is employed, this latter composition is preferably applied after the fibres have been formed but before they are disposed and in any case before they have cooled to a temperature below the boiling point of water. In another embodiment the mineral oil and thermosetting resin are added to the colloidal dispersion and emulsified therein so that the colloidal dispersion now comprises an aqueous continuous phase and a dispersed phase comprising particles of polyvinyl acetate, a wax, a mineral oil, a thermosetting resin in the thermoplastic state, and a curing catalyst therefor. This composite colloidal dispersion is then injected into the steam line prior to the contact of the steam with the molten stream of siliceous material.

As the molten stream of siliceous material is dispersed into fibres by the blast of high-pressure steam, the high temperature of the mineral fibres causes an immediate evaporation of the water from the composition and deposits on the surface of each of the fibres a multiplicity of fine particles of thermosetting resin, wax, and oil, or, alternatively, particles comprising polyvinyl acetate, wax, a thermosetting resin and mineral oil. As soon as the steam has evaporated, the high temperature of the fibres advances the cure of the thermosetting resin.

The treated fibres fall to the bottom of the deposition chamber and, as customary, may be conveyed from the chamber on an endless porous belt, in the form of a layer of fibres. The layer is then treated as may be desired for the production of insulating mats or other forms of mineral wool insulation.

The product produced according to the present invention is a siliceous fibre having on its surface a discontinuous deposit comprising a multiplicity of fine separate particles comprising a thermosetting resin, a mineral oil, a water-repellent wax or wax-like material, and in one embodiment, polyvinyl acetate.

The composition disposed on the fibres also imparts a binder action and imparts an increased resiliency to mats formed of the fibres. It has been found that by use of the composition of the present invention, the amount of mineral oil heretofore used in reducing the dust and laying the fibres may be reduced to one-third. It has also been found that a substantial waterproofing is imparted to siliceous fibres by small amounts of from 5 to 30 pounds of the solids in the composition to each ton of the mineral wool. This clearly demonstrates that the composition is not deposited on the fibres as a continuous surface coating but must be present in the form of particles or as a discontinuous deposit.

Another characteristic of the product is that due to the fact that the composition is applied to the fibres while they are at a temperature above the melting point of the composition, the particles deposited on the surface frequently cause a binding of adjacent fibres wherever they cross.

The waterproofness of mineral wool treated with the composition and according to the process of the invention is fundamentally different from waterproofness imparted thereto by prior compositions. Prior waterproofed mineral wool, if formed into a small ball and thrown on the surface of cold water, will remain floating for only about one hour. If the water is then heated to boiling, the ball of mineral wool will sink to the bottom. When a similar sample is waterproofed according to this invention, the ball will float indefinitely on cold water and will float on boiling water for periods over one hour. This clearly demonstrates that the water-resistant composition is not dissipated, evaporated or rendered soluble on boiling.

Having described my invention, what I claim as new and desire to secure by Letters Patent is:

A process for rendering mineral wool water-resistant comprising disrupting a molten stream of siliceous material by subjecting it to a blast of steam, the fibres so formed being deposited in the form of a mat, applying to the fibres at a point between the point of their formation and their point of deposit and while at an elevated temperature, a first composition comprising a thermosetting resin, a curing catalyst therefor, a mineral oil and a water-insoluble soap and thereafter applying to the fibres an aqueous colloidal dispersion comprising particles of polyvinyl acetate, and a wax, while said fibres are sufficiently heated to evaporate water from said fibres and advance the cure of the resin to deposit both compositions on said fibres in the form of a discontinuous deposit.

References Cited in the file of this patent

UNITED STATES PATENTS

| Number | Name | Date |
|---|---|---|
| 1,928,388 | Mottweiler et al. | Sept. 26, 1933 |
| 2,007,987 | Sussenguth | July 16, 1935 |
| 2,019,021 | O'Brien | Oct. 29, 1935 |
| 2,055,446 | Powell | Sept. 22, 1936 |
| 2,224,274 | Powers | Dec. 10, 1940 |
| 2,230,272 | Slayter | Feb. 4, 1941 |
| 2,252,157 | Bergin et al. | Aug. 12, 1941 |
| 2,261,983 | Ford | Nov. 11, 1941 |
| 2,270,662 | Raney | Jan. 20, 1942 |
| 2,315,735 | Richardson | Apr. 6, 1943 |
| 2,328,714 | Drill et al. | Sept. 7, 1943 |